Oct. 27, 1942.   C. E. HEMMINGER   2,300,152
ART OF CATALYTIC CRACKING
Filed Dec. 30, 1939
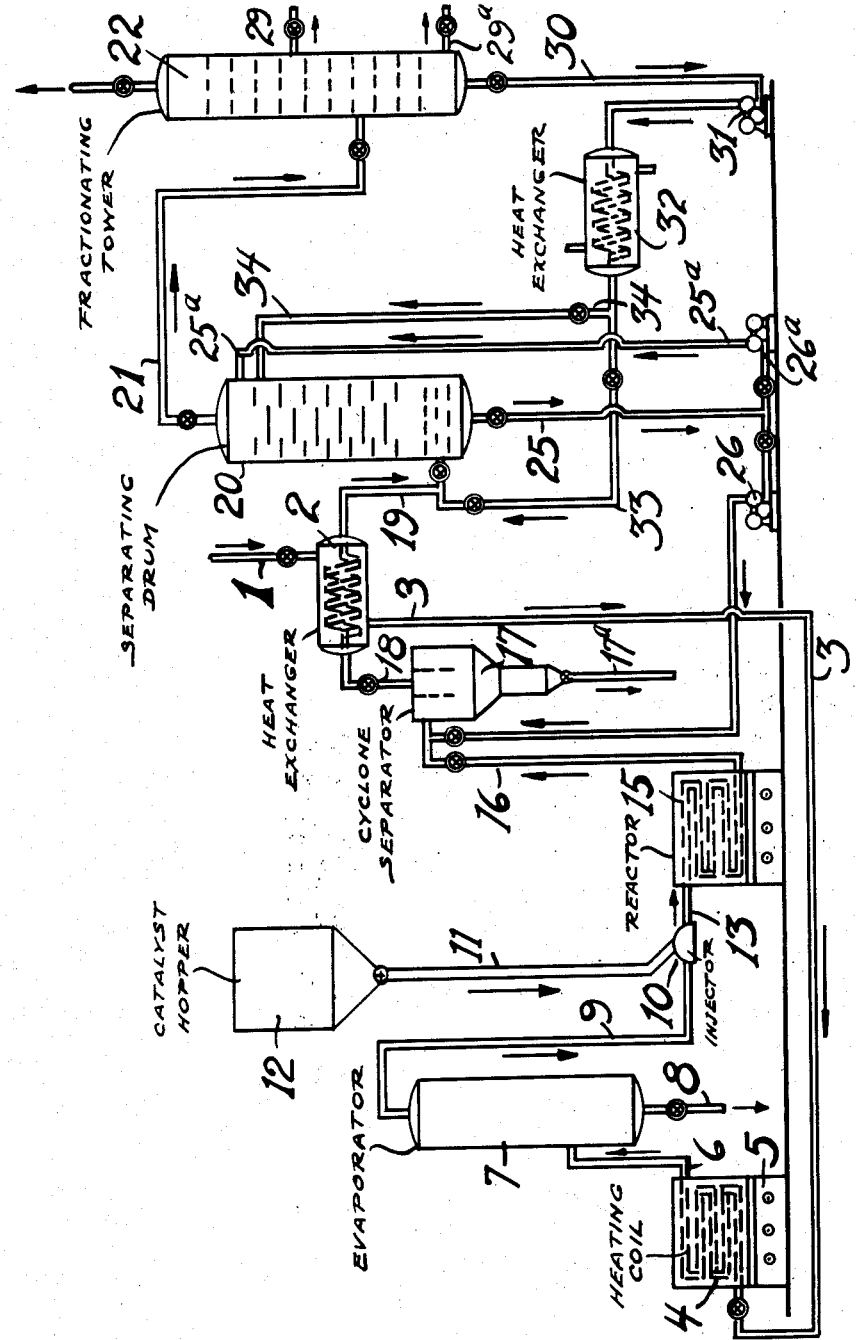
Charles E. Hemminger Inventor
By ⟨signature⟩ Attorney Patented Oct. 27, 1942

2,300,152

UNITED STATES PATENT OFFICE 2,300,152

ART OF CATALYTIC CRACKING

Charles E. Hemminger, Westfield, N. J., assignor to Standard Oil Development Company, a corporation of Delaware Application December 30, 1939, Serial No. 311,834

3 Claims. (Cl. 196—52)

The present invention relates to the art of treating hydrocarbons. More particularly, the present invention relates to a continuous operation in which hydrocarbons are converted to desired products while in the vapor phase, which vapors contain suspended therein a quantity of catalyst which may be in the form of a powder, granules, grains, lumps, shaped bodies and the like.

Prior to my present invention, it had been proposed by others to cause the conversion of a relatively high boiling hydrocarbon, such as a gas oil, to desired products, such as fractions boiling within the motor fuel range, by vaporizing said relatively high boiling hydrocarbon, suspending a catalyst therein and passing the suspension through a reaction zone at conversion temperatures and pressures. In this type of operation, it is necessary to employ cyclone separators or some such similar device to remove the catalyst from the reaction vapors. As a matter of fact, it is often necessary to employ several of these cyclone separators in series in order to completely remove the powdered catalyst from the reaction products. These cyclone separators entail a costly feature of the apparatus required for a process of the type indicated, and consequently, any process which would restrict the number of these separators would be of advantage and important from an economic standpoint.

It is a primary object of my invention to carry out the conversion of the relatively high boiling hydrocarbons while in the vapor state, and containing a divided catalyst suspended therein, by providing certain novel steps which eliminate the necessity for using more than one cyclone separator or equivalent device to completely separate the catalyst from the reaction vapors.

It is another object of my invention to cool the reaction vapors withdrawn from a primary catalyst separator, which vapors contain an appreciable amount of suspended catalyst, at a relatively high temperature level whereby droplets of oil are formed which serve to wash the last traces of catalyst out of the reaction vapors.

It is a third object of my invention to carry out an operation of the kind and character indicated under such conditions as will virtually assure the complete elimination of catalyst from the final products of my invention.

Other and further objects will appear from the ensuing description.

My invention is fully disclosed in the succeeding description and claims, reference being had to the accompanying drawing which shows diagrammatically one method of carrying my invention into effect.

Referring more particularly to the drawing for a clear understanding of my process, my invention may be performed as follows:

A fresh feed stock, such as a reduced crude having an A. P. I. gravity of about 28°, is introduced into the system through line 1, thence discharged into a heat exchanger 2, thence passed through line 3 into a fired coil 4 disposed in a furnace setting 5. This furnace may be of the usual type of construction employed in oil refineries. The oil is heated in coil 4 up to a temperature of say 900° F. while under a gauge pressure of 7–10 pounds per square inch, and then withdrawn through line 6 and passed into an evaporator 7 where heavy bottoms are removed and an overhead product for further treatment according to my invention is obtained. As indicated in the drawing, the bottoms are withdrawn through line 8. These bottoms may be discharged to a viscosity breaker or a coking operation, or they may be used as a bunker "C" fuel. The overhead product is withdrawn through line 9 and passed into a reaction coil 15 where the main conversion or reaction takes place. The temperature of the oil vapors in line 9 may be about 850° F., and at this temperature they are discharged into an injector 10, which is in communication with a reservoir 12 containing preferably hot regenerated catalyst at a temperature of about 1000° F. This catalyst may be in a powdered form with as much as 90% passing through a 300 mesh screen, although a classified catalyst, of a size such that all of it passes through a 10 mesh screen but is retained on a 200 mesh screen, is preferred. Catalyst is withdrawn through line 11 from hopper 12 and discharged into injector 10 where it is suspended in the vapors contained therein, this suspension then discharging into line 13 and thence into reactor 15 where it may reside from about 5 to 50 seconds. With 10 seconds resident time in reactor 15 catalyst in a ratio of 4 parts by weight to 1 part of oil is added and with the catalyst at 1000° F. and the oil vapors at 850° F., the reactor feed will have a temperature of about 925° F. Of course, it will be understood that the above precise details may vary within reasonable limits. It is not for example absolutely essential to fix the temperature of the vapors in line 13 at 925° F., although it is desirable to heat them well above 825° F. in order to secure a favorable product distribution; that is to say, high yields of gasoline of good quality. Due to the nature of the reaction which is endothermic, there will be a temperature drop across the coil 15, and where the inlet temperature is about 925° F., the outlet temperature will be of the order of about 875° F. It may be said that the pressure in this coil is relatively low, usually not over 10 pounds per square inch gauge, and preferably about 5 pounds per square inch gauge. This coil 15 may be replaced by a heat insulated drum. The reaction products containing the catalyst are discharged from coil 15 into conduit 16 leading to a cyclone separator 17 in which cyclone separator over 96% of the catalyst is removed and withdrawn through line 17—a for purging and regeneration (not shown), and thereafter returned to hopper 12 for further use in the process. The overhead product from cyclone separator 17 is withdrawn through line 18, and in the concrete example now being given would ordinarily have a temperature of 850° F. The product in line 18 is discharged into heat exchanger 2 where a portion of the heat is withdrawn by indirect heat exchange with the relatively cold fresh feed, so that when withdrawn from the heat exchanger 2 through line 19 it is at a temperature of about 600° F. The presence of catalyst in the vapors in line 18 to heat exchanger 2 is desirable in the operation of the heat exchanger 2 for otherwise the liquid condensate would tend to deposit polymerized unsaturates and coke on the walls of the tubes in exchanger 2. The catalyst tends to prevent this carbon deposition because of its scrubbing action against the tube inner surfaces. At the temperature stated, a portion of the vapors is liquefied and this liquid portion serves to scrub out of the gases, catalyst contained therein, so that when the product is discharged into separating drum 20, the liquid portion contains substantially all of the catalyst and collects near the base of the said drum, while the overhead product withdrawn through line 21, is discharged into a fractionating column 22. The overhead product from fractionating tower 22 may then be sent to a condenser (not shown) and thence to a stabilizing drum (not shown) for recovery of a fraction boiling within the gasoline range, while unconverted gas oil is withdrawn through line 29 and line 29—a.

Referring back to the separator 20, the bottoms from this drum are withdrawn through line 25 and returned by means of pump 26 to the line 16 leading into cyclone separator 17. It will thus be observed that a minor portion of catalyst circulates continuously between cyclone separator 17 and separating drum 20. As indicated previously, it will be observed that by so practicing my invention, I prevent the appearance in the vapors leaving fractionating column 22 of any catalyst and thereby prevent its presence in the final product, and I accomplish this result by employing only one cyclone separator. Of course, in the regeneration of the catalyst it is necessary also, to employ a cyclone separator or some suitable device when the catalyst is regenerated by heating the same in the presence of an oxidizing gas, the preferred procedure being to carry out the regeneration under pressure of the order of 45 pounds per square inch gauge, at which pressure the regeneration may be carried out at lower temperature levels.

It will be obvious to those familiar with this art that many modifications of my invention may be made without departing from the real spirit of the same. For instance, evaporator 7 may be eliminated if the original charging stock is relatively free of tar or tar-forming constituents. Furthermore, it is entirely within the scope of the present invention to discharge the bottoms from separating drum 20, first into line 25, thereafter into line 25—a and to pump these bottoms by means of pump 26—a into the separator through line 25—a at a point near the top thereof whereby the vapors discharging through line 21 are further scrubbed of entrained catalyst. Also, some of the bottoms from fractionating tower 22 may be withdrawn through line 30, pumped by pump 31 through a heat exchanger 32 where it is cooled to about 300° F. then discharged into line 33 and thence into line 19 for return to the separating drum 20, or the fractionator bottoms in line 33 may be discharged in line 34 to top of separator 20 to serve as a liquid reflux in separator 20. Separator 20 may be any known gas-liquid contact apparatus such as a tower containing disc and doughnut trays, bubble cap trays, solid packing or the like.

Cooling of the vapor-catalyst mixture can be effected also by other means such as cooling coils disposed in top of separator 20, cooling and refluxing vapors in line 21, and injecting of an extraneous cooling medium such as liquid butane into line 18.

The catalyst removed from the bottom of separator or scrubber 20 may be recovered and used in various ways such as recycled to the reactor 15 for reuse; used in subsequent processing of the oil recovered as bottoms from 20 with or without other oil, or recovered in another cyclone separator after vaporization in another furnace.

Any and all of the original expedients or the modifications thereof may be resorted to, to eliminate substantially completely the last traces of catalyst from the final desired product.

What I claim is:

1. In the method of treating hydrocarbons for the purpose of catalytically converting relatively high boiling hydrocarbons into products of lower boiling range wherein the conversion takes place in vapor phase, a powdered catalyst being suspended in the vapors during the conversion, the improvement which comprises withdrawing the reaction vapors from the reaction zone, separating the main portion of the catalyst by centrifugal action in a separation zone, cooling the vapors recovered from the separation zone to liquefy at least a portion thereof, conducting the cooled vapors to a fractionation zone wherein the said vapors are fractionated, withdrawing a liquid condensate from the bottom of said fractionation zone and recirculating a portion of said condensate to the top of said fractionation zone and a second portion of said condensate to the vapors entering the separation zone.

2. The process set forth in claim 1 in which an overhead vapor fraction is recovered from the fractionation zone and discharged into a second fractionation zone from which second fractionation zone a liquid condensate is withdrawn and recirculated in part to the top of the first fractionation zone and in part to the bottom of said first fractionation zone.

3. The process set forth in claim 1 in which the vapors withdrawn from the separation zone are at a temperature of about 850° F. and are cooled to about 600° F. before discharging into the first fractionation zone.

CHARLES E. HEMMINGER.